Patented Dec. 15, 1953

2,662,892

UNITED STATES PATENT OFFICE 2,662,892

DYES OF THE DIBENZANTHRONE SERIES

Paul R. Johnson, Wilmington, Del., assignor to E. I. du Pont de Nemours and Company, Wilmington, Del., a corporation of Delaware No Drawing. Application August 25, 1951, Serial No. 243,763

2 Claims. (Cl. 260—340.3)

This invention relates to a new vat dye of the dibenzanthrone series, and more particularly to a bright greenish-blue vat dye obtained by the alkylation of Bz-2,Bz-2'-dihydroxy-dibenzanthrone with 4-chloro-1,2-butadiene, which dye has the structural formula:

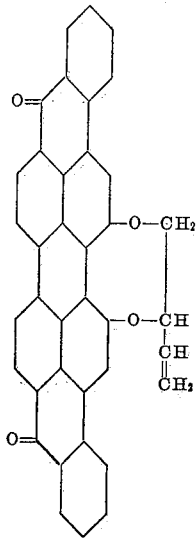

In general, vat dyes of the anthraquinone class, although more costly to produce than other dyes, are widely used in the textile industry due to their general superior fastness properties, particularly to washing, light and bleaches. While a number of blue dyes have been produced in the anthraquinone vat dye series, there has not been produced a bright greenish-blue vat dye having general fastness properties that are desired for many uses. In general, the blue dyes of the indanthrone class (see Color Index Nos. 1106, 1113 and 1114) have found greatest acceptance because of their brightness of shade and excellent wash fastness and light fastness, although they are deficient in bleach fastness. Other vat dyes of the dibenzanthrone series have been produced which dye in blue shades, but in general these are redder shades of blue and belong more to the navy blue range of colors such as dibenzanthrone itself and certain ethers and halogen derivatives thereof.

Where a bleach-fast bright blue dye in the vat dye series has been required, resort has been made to the use of a mixed color produced by mixing certain reddish-blues with greens or greenish-blue dyes to produce the desired shades.

There is a continuing demand for a bleach-fast bright blue vat dye which has the brilliance of the indanthrone dyes but which has greater fastness particularly to bleach.

It is therefore an object of this invention to provide a bright blue vat dye of the anthraquinone series which has good bleach fastness as well as other good wash fastness and light fastness properties. A more specific object of the invention is to produce a bright blue dye of the dibenzanthrone series by alkylating Bz-2,Bz-2'-dihydroxy-dibenzanthrone with 4-chloro-1,2-butadiene.

I have found that where Bz-2,Bz-2'-dihydroxy-dibenzanthrone is alkylated with 4-chloro-1,2-butadiene the resulting vat dye when applied to cellulosic materials gives bright greenish blue shades which cannot be matched in brilliance and bleach fastness by any other vat dye of the anthraquinone series nor by any mixture of blue and green dyes presently available in that class. The resulting product shows good general fastness properties including fastness to water spotting, while in its fastness to light it is even superior to the redder dye produced according to U. S. Patent 2,218,663.

The Bz-2,Bz-2'-dihydroxy-dibenzanthrone employed as the starting material in the production of the new dye of this invention may be produced as disclosed in U. S. Patents 1,866,501 and 1,990,603 or it may be an alkali metal salt as more particularly disclosed in U. S. Patents 1,950,366, 1,957,547 and 2,278,987. The alkylation is preferably carried out under anhydrous or substantially anhydrous conditions and in the presence of an acid binding agent or agents such as the alkali metal carbonates and acetates. In general the reaction is carried out in an organic solvent which is inert under the conditions of the reaction, such as the chlorobenzenes, etc., and any moisture that may be present in the starting materials may be removed by heating the solvent solution of the dihydroxy-dibenzanthrone or its alkali metal salt to a temperature sufficiently high to drive out the moisture prior to the addition of the alkylating agent. Four mols of the alkali metal carbonate per mol of dihydroxy-dibenzanthrone is generally sufficient, and smaller amounts may be employed in most cases. It has also been found that the yields of the desired dye can be materially improved where the water formed during the reaction is removed continuously during the alkylation. This can be done by cycling the reflux of the diluent with continuous water removal. The alkylation with the 4-chloro-1,2-butadiene is carried out at temperatures of from 130° to 200° C., although temperatures below and above these limits may be employed depending upon the particular solvent used or whether the time required can be extended. The alkylation is accelerated and polymerization of the 4-halogen-1,2-butadiene is inhibited by the presence of nitrogenous heterocyclic bases such as pyridine, picolines, lutidines, etc., or mixtures thereof, as described in the alkylation of dibenzanthrone with other alkylating agents.

4-bromo-1,2-butadiene may be substituted for the 4-chloro-1,2-butadiene. Some of the 4-halogen-1,2-butadiene is usually destroyed—therefore an excess of this reagent should be employed if the reaction is to be carried to completion.

The resulting alkylation product of the dihydroxydibenzanthrone may be isolated either by steam distillation or by hot filtration of the diluted reaction mass. The latter is preferred if the reaction mass contains any substantial amount of unchanged starting material, as such starting material is insoluble in the solvent mass and is removed by hot filtration. Since the crude reaction mass usually contains varying proportions of vat insoluble dye products, these should be removed by vatting and filtering the vatted dye. The dye may also be purified by recrystallization from inert high boiling solvents.

The following examples are given to illustrate the invention. The parts used are by weight.

*Example 1*

Suspend 25 parts of Bz-2,Bz-2'-dihydroxydibenzanthrone monosodium salt (obtained according to Example 1 of U. S. Patent 1,950,366), ground to 60 mesh or finer, in 175 parts of o-dichlorobenzene in a glass vessel. Add 10.4 parts of potassium carbonate and 8 parts of anhydrous sodium acetate. Heat the mixture to 170° C. with agitation to remove the moisture. Then connect a distilling column to the glass vessel and attach a down condenser and a trap so that a cycling reflux can be carried out and water removed as formed.

Add 20 parts of 4-chloro-1,2-butadiene to the hot reaction mixture as rapidly as possible, and over a period of less than ten minutes. The reaction is continued at reflux temperature and with continuous removal of water for eighteen hours. Then add 260 parts of o-dichlorobenzene and stir the mixture at 180° C. for one hour. Then filter the mixture on a heated filter. The product separates from the filtrate on cooling in the form of rod-shaped crystals and may be isolated by filtration or by steam distillation of the solvent. The compound obtained is represented by the formula given in column 1.

*Example 2*

Suspend 25 parts of Bz-2,Bz-2'-dihydroxydibenzanthrone sodium salt, ground to 60 mesh or finer (obtained according to Example 1 of U. S. Patent 1,950,366), in 275 parts of o-dichlorobenzene in a glass or enamel lined vessel. Add 12.5 parts of potassium carbonate and 8⅓ parts of anhydrous sodium acetate. Heat the suspension to the boil with agitation and distill off 75 parts of solvent to remove moisture. Then connect a distilling column to the reaction vessel and attach a down condenser and trap so that a cycling reflux can be carried out and water removed as formed. Cool the mixture to 120° C. and add 8 parts of pyridine bases (a mixture of isomeric picolines, boiling range 118° to 140° C.), followed by the addition over a period of about ten minutes of 25 parts of 4-chloro-1,2-butadiene dissolved in 25 parts of o-dichlorobenzene. Heat the reaction mass under agitation until a steady distillate reflux is obtained and agitate under this condition for at least three hours with removal of water as formed. Add 500 parts of o-dichlorobenzene, adjust the temperature to 170° C. and filter the reaction mass on a heated filter. Steam distill the filtrate free from solvent in the presence of 25 parts of soda ash and filter off the residue and wash it with water. Purify this crude product by vatting and filtering the soluble leuco sodium salt (vat) so obtained, followed by aeration of the filtrate until the precipitation of the dye is complete, and filter off the dye. Further purify the vat-clarified product by crystallization from boiling o-dichlorobenzene.

*Example 3*

Slurry a filter press cake equivalent to 25 parts of Bz-2,-Bz-2'-dihydroxydibenzanthrone sodium salt obtained according to Example 2 of U. S. Patent 1,957,547, in 250 parts of o-dichlorobenzene together with 15 parts of potassium carbonate dissolved in 15 parts of water. Heat the mixture with stirring in a closed vessel fitted for distillation, until the water has distilled off and the temperature has risen to from 170° to 175° C. Cool the mass, add 15 parts of dry potassium carbonate and mill the mass free from lumps, and transfer the mixture to a glass or enamel lined reaction vessel as in Example 2. From this point the alkylation and isolation is the same as in Example 2. The vat dye of the formula given above is obtained.

*Example 4*

When the process of Example 3 is carried out, using 0.27 part of Terpene B (a mixture of about equal parts of dipentene, terpinolene and terpinene) with the 4-chloro-1,2-butadiene before adding the latter to the reaction mass, one obtains in excellent yield the same product as described in the foregoing examples.

*Example 5*

An aqueous filter press cake, equivalent to 25 parts of dry Bz-2,Bz-2'-dihydroxydibenzanthrone obtained according to Example 1 of U. S. Patent 1,866,501, is treated as in Example 2 of U. S. Patent 1,957,547 and the resulting filter press cake of Bz-2,Bz-2'-dihydroxydibenzanthrone sodium salt is alkylated as in Example 3 above, using 40 parts of 4-bromo-1,2-butadiene instead of 25 parts of 4-chloro-1,2-butadiene. On isolation of the product by the process of Example 2 above, the same dye is obtained as in the preceding examples.

The product of all of the foregoing examples after purification consists of dark blue to blue-black crystals or powder, which are soluble in concentrated sulfuric acid with a red-violet color and in warm dilute alkaline hydrosulfite solution with blue color and red fluorescence. When applied to cellulose fibers from the usual alkaline hydrosulfite vat, the dyeings are greenish-blue, being bluer than the bluest member of the series described in U. S. Patent 2,318,266. The dyeings show good fastness to washing, to hypochlorite bleach, to water spotting, and acceptable fastness to light, being superior in the latter respect when tested in the Fade-O-meter compared with the product of Example 2 of U. S. Patent 2,218,663.

The dye of this invention may be applied to cellulosic textile materials by any of the methods ordinarily employed in the application of vat dyes, such as by reduced vat dyeing, pigment pad dyeing, machine dyeing and by the usual textile printing methods.

In place of the o-dichlorobenzene employed in the above examples, other high boiling inert solvents, such as the monochlorobenzene, o-chlorotoluene, trichlorobenzene, tetrahydronaphthalene or other solvents which are liquid at temperatures of from 132° to 210° C., may be employed.

I claim:
1. The compound of the following formula:

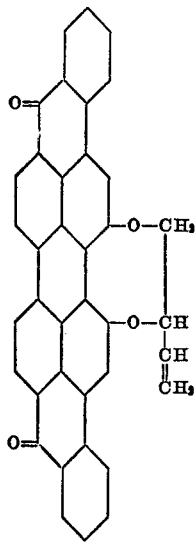

2. Process for preparing a bright blue dye of the dibenzanthrone series which exhibits good bleach and wash fastness, which comprises reacting a compound of the class consisting of Bz-2, Bz-2'-dihydroxydibenzanthrone and its alkali metal salts under substantially anhydrous conditions with a 4-halogen-1,2-butadiene of the class consisting of 4-chloro-1,2-butadiene and 4-bromo-1,2-butadiene in an inert organic solvent at a temperature of from 130° to 200° C. and in the presence of an acid binding agent.

PAUL R. JOHNSON.

References Cited in the file of this patent
UNITED STATES PATENTS

| Number | Name | Date |
|---|---|---|
| 2,218,663 | Stallmann | Oct. 22, 1940 |
| 2,318,266 | Stallmann | May 4, 1943 |